US008557469B2

United States Patent
Matsuda et al.

(10) Patent No.: US 8,557,469 B2
(45) Date of Patent: Oct. 15, 2013

(54) DIRECT OXIDATION FUEL CELL

(75) Inventors: Hiroaki Matsuda, Osaka (JP); Takashi Akiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 427 days.

(21) Appl. No.: 12/891,245

(22) Filed: Sep. 27, 2010

(65) Prior Publication Data

US 2011/0076593 A1 Mar. 31, 2011

(30) Foreign Application Priority Data

Sep. 28, 2009 (JP) .................................. 2009-223358

(51) Int. Cl.
*H01M 8/22* (2006.01)
*H01M 8/10* (2006.01)
*H01M 8/04* (2006.01)

(52) U.S. Cl.
USPC ............................ 429/483; 429/506; 429/514

(58) Field of Classification Search
USPC .......... 429/431, 442, 483, 413, 449, 506, 514
See application file for complete search history.

(56) References Cited

U.S. PATENT DOCUMENTS

| 6,106,965 | A * | 8/2000 | Hirano et al. .................. 429/482 |
| 2004/0058227 | A1 * | 3/2004 | Tanaka et al. ..................... 429/44 |
| 2005/0271929 | A1 * | 12/2005 | Sompalli et al. ................. 429/40 |
| 2005/0282049 | A1 * | 12/2005 | Sasaoka et al. .................. 429/13 |
| 2008/0032181 | A1 * | 2/2008 | Yamamoto ....................... 429/41 |
| 2008/0206616 | A1 | 8/2008 | Atanassova et al. |
| 2008/0261103 | A1 | 10/2008 | Ueda |
| 2009/0148752 | A1 | 6/2009 | Ueda et al. |
| 2010/0209806 | A1 | 8/2010 | Cremers et al. |

FOREIGN PATENT DOCUMENTS

| DE | 10 2007 031 526 A1 | 1/2009 |
| JP | 2001-319663 | 11/2001 |
| JP | 2002-237306 | 8/2002 |

\* cited by examiner

*Primary Examiner* — Kenneth Douyette
(74) *Attorney, Agent, or Firm* — McDermott Will & Emery LLP

(57) ABSTRACT

A direct oxidation fuel cell including at least one cell, the cell being a stacked body including: a membrane electrode assembly including an anode, a cathode, and an electrolyte membrane disposed between the anode and the cathode; an anode-side separator having a fuel flow channel for supplying a liquid fuel to the anode; and a cathode-side separator having an oxidant flow channel for supplying an oxidant to the cathode, in which the anode-side separator includes a first region including an upstream half of the fuel flow channel and a second region including a downstream half of the fuel flow channel, the anode includes an anode catalyst layer in contact with the electrolyte membrane and an anode diffusion layer in contact with the anode-side separator, the anode catalyst layer includes an anode catalyst and a polymer electrolyte, the anode catalyst layer includes an upstream-side region facing the first region and a downstream-side region facing the second region, and the content of the polymer electrolyte in the anode catalyst layer is higher at the upstream-side region than at the downstream-side region.

11 Claims, 3 Drawing Sheets

DIRECT OXIDATION FUEL CELL

This application claims priority to JP 2009-223358 filed in Japan on Sep. 28, 2009, the contents of which are incorporated herein in its entirety.

FIELD OF THE INVENTION

The invention relates to a direct oxidation fuel cell, and particularly, to an improvement in the structure of an anode catalyst layer.

BACKGROUND OF THE INVENTION

In accordance with higher performance in mobile devices such as cellular phones, notebook personal computers, and digital cameras, fuel cells using solid polymer electrolyte membranes are anticipated as the power source for such devices. Among solid polymer electrolyte fuel cells, direct oxidation fuel cells are suited for being reduced in size and weight, and are being developed as the power source for mobile devices. A liquid fuel such as methanol is directly supplied to an anode in direct oxidation fuel cells.

Fuel cells include membrane electrode assemblies (MEAs). An MEA has a polymer electrolyte membrane with an anode (fuel electrode) joined to one face thereof and a cathode (air electrode) joined to the other face thereof. The anode includes an anode catalyst layer and an anode diffusion layer, while the cathode includes a cathode catalyst layer and a cathode diffusion layer. The MEA is sandwiched between a pair of separators to constitute a cell. The anode-side separator has a fuel flow channel for supplying a fuel such as hydrogen gas or methanol to the anode. The cathode-side separator has an oxidant flow channel for supplying an oxidant such as oxygen or air to the cathode.

Direct oxidation fuel cells have some problems to be solved.

One of them is a problem related to power generation characteristics and power generation efficiency. There are several causes for deterioration in power generation characteristics and power generation efficiency. One of them is fuel crossover. When methanol is used as the fuel, a phenomenon called methanol crossover (MCO) occurs. MCO is a phenomenon in which methanol as the liquid fuel supplied to the anode permeates through the electrolyte membrane and migrates to the cathode.

Note that it is difficult for hydrogen gas to dissolve in water compared to methanol, and therefore, in a polymer electrolyte fuel cell using hydrogen gas as the fuel, hydrogen gas hardly ever permeates through the electrolyte membrane to migrate to the cathode. That is, methanol crossover is a phenomenon which occurs prominently when methanol or an aqueous methanol solution is used as the fuel.

Crossover of a liquid fuel lowers the cathode potential, thereby decreasing the power output. Also, the liquid fuel that have permeated through the electrolyte membrane and reached the cathode reacts with the oxidant, thereby causing extra oxidant to be consumed. Thus, the oxidant concentration lowers at the downstream side of the oxidant flow channel at the cathode side, thereby decreasing the power output thereat. Also, fuel is undesirably consumed, thereby causing power generation efficiency to decrease.

In order to suppress crossover of liquid fuel, decreasing a diffusion of liquid fuel at the anode catalyst layer is considered to be effective. However, decreasing the diffusion in the entire anode would result in lack of fuel at the downstream side of the fuel flow channel at the anode side, thereby causing the output to lower thereat.

For example, Japanese Laid-Open Patent Publication No. 2002-237306 (Patent Document 1) proposes a solid polymer electrolyte fuel cell using hydrogen gas as fuel, in which the pore size and pore volume of the catalyst layer is made larger at the downstream side of the fuel flow channel to suppress the decrease of diffusion of reactant gas at the downstream side. In Patent Document 1, the molecular weight of the organic solvent contained in the ink for forming a catalyst layer is changed so as to form catalyst layers with different pore sizes and pore volumes, at the upstream side and the downstream side of the fuel flow channel, respectively. However it does not aim to reduce liquid fuel crossover.

Japanese Laid-Open Patent Publication No. 2001-319663 (Patent Document 2) proposes a solid polymer electrolyte fuel cell using hydrogen gas, in which the content of the polymer electrolyte in the catalyst layer is made smaller at the diffusion layer side and at the downstream side of the fuel flow channel or the oxidant flow channel, so as to prevent interruption of gas diffusion from occurring. Likewise, it does not aim to suppress liquid fuel crossover.

Since Patent Documents 1 and 2 are techniques related to a fuel cell using hydrogen gas as fuel, it would not be possible to reduce liquid fuel crossover even if the techniques disclosed in these documents are used.

For example, with respect to the technique disclosed in Patent Document 1, changing the porosity of the catalyst layer without changing the composition of the catalyst layer itself would necessarily cause a change in the thickness of the catalyst layer or in the amount of the catalyst applied. For example, between a high-porosity part and a low-porosity part, the thickness of the high-porosity part would be thicker than the thickness of the low-porosity part if the amount of the catalyst applied is uniform. If the respective thicknesses of the high-porosity part and the low-porosity part are uniform, the amount of the catalyst applied would be smaller at the high-porosity part. Such change undesirably causes change in the balance of the MEA and is a contributing factor to the deterioration in power generation characteristics of the entire fuel cell.

With respect to the technique disclosed in Patent Document 2, if the content of the polymer electrolyte in the thickness direction of the catalyst layer is made smaller at the anode diffusion layer side, improvements in water removal and power generation characteristics would be possible. On the other hand, in the case of a direct oxidation fuel cell, a liquid fuel can easily diffuse through an anode catalyst layer, thereby leading to an increase in liquid fuel crossover. That is, changing the content of the polymer electrolyte in the thickness direction of the catalyst layer is a contributing factor to the deterioration in power generation characteristics. Moreover, Patent Document 2 totally fails to disclose an appropriate range for the content of the polymer electrolyte in each portion of the anode catalyst layer.

BRIEF SUMMARY OF THE INVENTION

An object of the present invention is to improve power generation characteristics and power generation efficiency of a fuel cell when a liquid fuel is used, by controlling fuel diffusion at the anode catalyst layer to reduce fuel crossover.

One aspect of the present invention is a direct oxidation fuel cell including at least one cell, the cell being a stacked body including: a membrane electrode assembly including an anode, a cathode, and an electrolyte membrane disposed between the anode and the cathode; an anode-side separator having a fuel flow channel for supplying a liquid fuel to the anode; and a cathode-side separator having an oxidant flow channel for supplying an oxidant to the cathode, in which: the anode-side separator includes a first region including an upstream half of the fuel flow channel and a second region including a downstream half of the fuel flow channel; the anode includes an anode catalyst layer in contact with the electrolyte membrane and an anode diffusion layer in contact with the anode-side separator; the anode catalyst layer includes an anode catalyst and a polymer electrolyte; the anode catalyst layer includes an upstream-side region facing the first region and a downstream-side region facing the second region; and the content of the polymer electrolyte in the anode catalyst layer is higher at the upstream-side region than at the downstream-side region.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
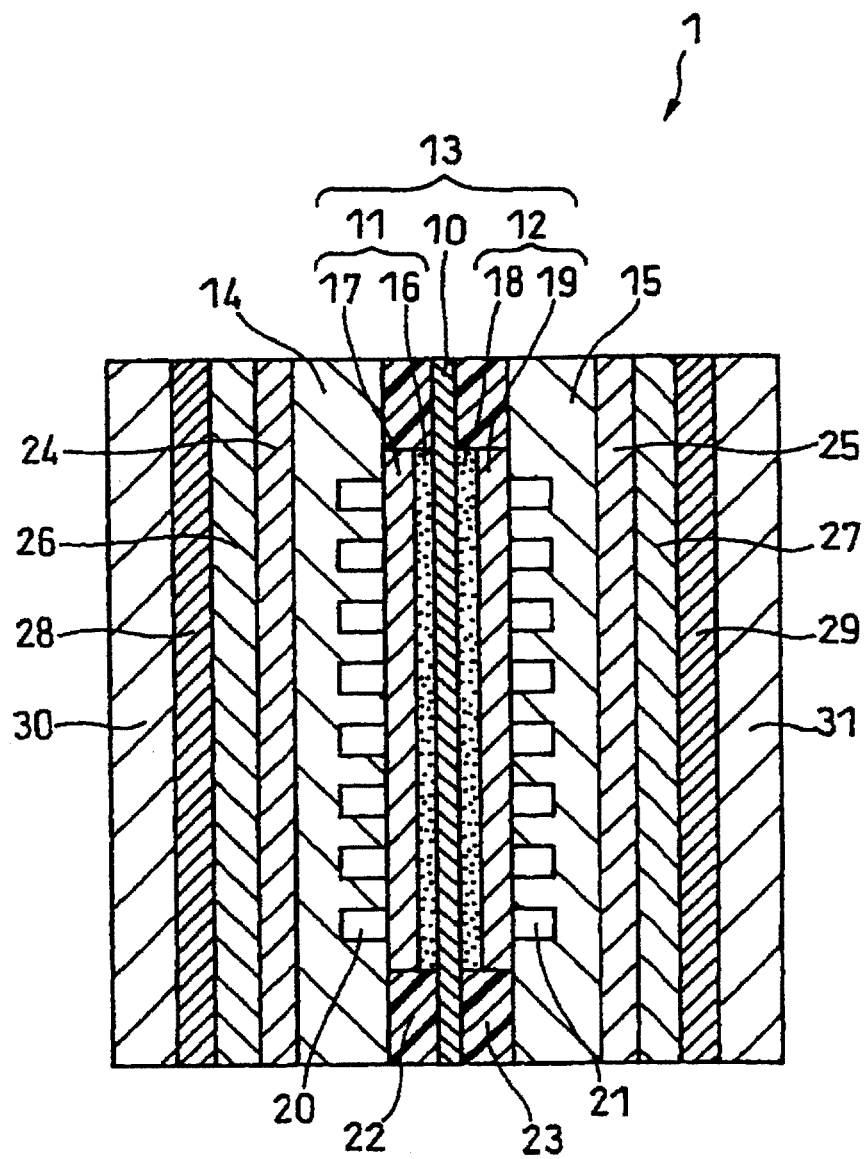
FIG. 1 is a vertical sectional view schematically illustrating a direct oxidation fuel cell according to an embodiment of the present invention.
Figure 2:
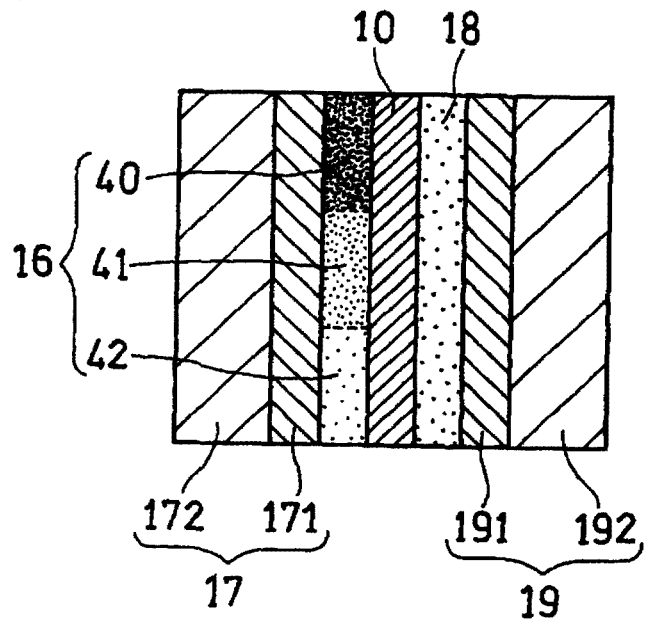
FIG. 2 is an enlarged view of the main part of the direct oxidation fuel cell illustrated in FIG. 1.

FIG. 1 is a vertical sectional view schematically illustrating a direct oxidation fuel cell according to an embodiment of the present invention. FIG. 2 is an enlarged view of the main part of the direct oxidation fuel cell illustrated in FIG. 1.

The fuel cell 1 of FIG. 1 has a membrane electrode assembly (MEA) 13 including an anode 11, a cathode 12, and an electrolyte membrane 10 interposed between the anode 11 and the cathode 12. A gasket 22 is disposed on a lateral side of the anode 11 so as to tightly seal the anode 11, while a gasket 23 is disposed on a lateral side of the cathode 12 so as to tightly seal the cathode 12. The membrane electrode assembly 13 is sandwiched between an anode-side separator 14 and a cathode-side separator 15. The anode-side separator 14 is in contact with the anode 11, while the cathode-side separator 15 is in contact with the cathode 12. The anode-side separator 14 has a fuel flow channel 20 for supplying a liquid fuel to the anode 11. The cathode-side separator 15 has an oxidant flow channel 21 for supplying an oxidant to the cathode 12.

The anode 11 includes an anode catalyst layer 16 in contact with the electrolyte membrane 10 and an anode diffusion layer 17 in contact with the anode-side separator 14. Also, as illustrated in FIG. 2 of an enlarged view of the main part in FIG. 1, the anode diffusion layer 17 includes a conductive water-repellent layer 171 in contact with the anode catalyst layer 16 and a substrate layer 172 in contact with the anode-side separator 14.

The cathode 12 includes a cathode catalyst layer 18 in contact with the electrolyte membrane 10 and a cathode diffusion layer 19 in contact with the cathode-side separator 15. Also, as illustrated in FIG. 2, the cathode diffusion layer 19 includes a conductive water-repellent layer 191 in contact with the cathode catalyst layer 18 and a substrate layer 192 in contact with the cathode-side separator 15.

The anode catalyst layer includes an anode catalyst and a polymer electrolyte. The anode catalyst can be a noble metal with high catalytic activity such as platinum. Also, in terms of reducing catalyst poisoning by carbon monoxide, an alloy of platinum and ruthenium may be used as the anode catalyst. The anode catalyst may be used with or without a support. The support is preferably a carbon material such as carbon black due to being high in electron conductivity and acid resistance.

The polymer electrolyte is preferably a perfluorosulfonic acid-based polymer material or a hydrocarbon-based polymer material, having proton conductivity. Materials such as Nafion® and Flemion® can be used as the perfluorosulfonic acid-based polymer material. Materials such as sulfonated polyetheretherketone and sulfonated polyimide can be used as the hydrocarbon-based polymer material.

In the present embodiment, the anode-side separator includes a first region including the upstream half of the fuel flow channel and a second region including the downstream half of the fuel flow channel. Also, the anode catalyst layer includes an upstream-side region facing the first region of the anode-side separator and a downstream-side region facing the second region of the anode-side separator. Further, the content of the polymer electrolyte in the anode catalyst layer is higher at the upstream-side region than at the downstream-side region. That is, the content of the polymer electrolyte changes in the face direction of the anode catalyst layer. The content of the polymer electrolyte may decrease either continuously or stepwise, from the end portion of the upstream-side region toward the end portion of the downstream-side region. Particularly, it is preferable that the content of the polymer electrolyte decreases stepwise from the end portion of the upstream-side region toward the end portion of the downstream-side region. This is because the process for producing the anode catalyst layer is made easier and the content of the polymer electrolyte can be more easily controlled. The content of the polymer electrolyte is changed, for example, preferably in 2 to 10 steps and more preferably in 2 to 5 steps.

As described above, the content of the polymer electrolyte in the anode catalyst layer is higher at the upstream-side region than at the downstream-side region, and therefore, the porosity of the upstream-side region of the anode catalyst layer can be made lower than the porosity of the downstream-side region of the anode catalyst layer. As a result, diffusion of a liquid fuel such as methanol can be controlled effectively in the entire anode catalyst layer. Thus, liquid fuel crossover can be reduced at the upstream-side region of the anode catalyst layer and a supply of fuel can be sufficiently ensured at the downstream-side region of the anode catalyst layer. As a result, decreases in power output due to liquid fuel crossover and to lack of fuel supply can both be suppressed. Thus, power generation characteristics and power generation efficiency of a fuel cell can be remarkably improved by the present embodiment.

Further, in the present embodiment, the above effect can be achieved by changing the content of the polymer electrolyte in the anode catalyst layer as described above. Thus, the thickness of the anode catalyst layer and the amount of the anode catalyst therein can be made uniform in the entire anode catalyst layer, thereby making it possible to further suppress deterioration in power generation characteristics.

Figure 3:
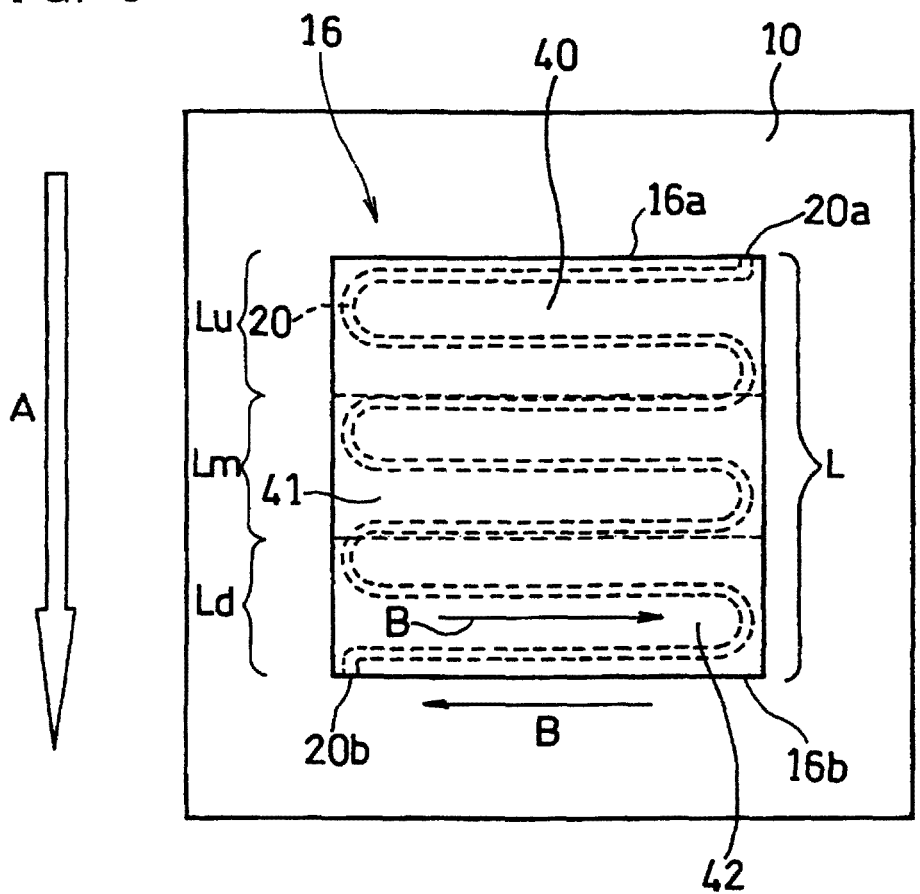
FIG. 3 is a front view schematically illustrating an anode catalyst layer included in a direct oxidation fuel cell according to an embodiment of the present invention.

The anode catalyst layer 16 preferably includes at the upstream-side region, a high concentration region in which the content of the polymer electrolyte is 27 to 50 mass %. Further, preferably included at the downstream-side region of the anode catalyst layer 16 is a low concentration region in which the content of the polymer electrolyte is 5 to 25 mass %. This will be described with reference to FIG. 3. FIG. 3 is a front view schematically illustrating an anode catalyst layer included in a direct oxidation fuel cell according to one embodiment of the present invention. Note that the electrolyte membrane 10 and the anode catalyst layer 16 carried thereon are illustrated in FIG. 3. Further, the fuel flow channel 20 with a serpentine shape facing the anode catalyst layer 16 is indicated as a dotted line in FIG. 3.

The direction of fuel flow can be explained as: a direction (macro-flow direction) from an upstream side toward a downstream side the fuel flow channel, the upstream side being the fuel supply side (side of a fuel inlet 20a) of the fuel flow channel and the downstream side being the other side (side of a fuel discharge 20b of the fuel flow channel); and a direction (micro-flow direction) following the fuel flow channel. For example, when the fuel flow channel has a serpentine shape as indicated in FIG. 3, the macro-flow direction of the fuel flow channel 20 from the upstream side toward the downstream side (direction of an arrow A: the average direction in which fuel concentration decreases) is different from the micro-flow direction of the fuel flow channel 20 (direction of an arrow B).

In the present embodiment, when the upstream side and the downstream side of the fuel flow channel are designated based on the macro-flow direction of fuel, it is preferable that the content of the polymer electrolyte in the anode catalyst layer is changed, from the end portion of the upstream-side region facing the upstream side of the fuel flow channel toward the end portion of the downstream-side region facing the downstream side thereof. This makes the process for producing the anode catalyst layer easier and enables easier control of the content of the polymer electrolyte.

A description is given below of the case where the content of the polymer electrolyte in the anode catalyst layer is changed from the upstream side toward the downstream side of the fuel flow channel, when the fuel supply side of the fuel flow channel is designated as the upstream side and the fuel discharge side thereof is designated as the downstream side, based on the macro-flow direction of fuel. However, in another preferable embodiment of the present invention, the content of the polymer electrolyte in the anode catalyst layer may be changed from the upstream side toward the downstream side of the fuel flow channel, with the upstream side and the downstream side designated based on the micro-flow direction of fuel. In the following, a description will be given on the case where the content of the polymer electrolyte is decreased in a stepwise manner.

The anode catalyst layer 16 of FIG. 3 has a high concentration region 40 with the content of the polymer electrolyte being 27 to 50 mass % and a low concentration region 42 with the content of the polymer electrolyte being 5 to 25 mass %. In FIG. 3, a middle concentration region 41 is provided between the high concentration region 40 and the low concentration region 42, the content of the polymer electrolyte therein being between that of the high concentration 40 and that of the low concentration region 42. The content of the polymer electrolyte decreases stepwise in the order of the high concentration region 40, the middle concentration region 41, and the low concentration region 42.

The region where the high concentration region 40 is provided is preferably 1/1.5 to 1/10 and further preferably 1/3 to 1/6 of the anode catalyst layer 16 from an upstream side end 16a thereof. Specifically, when the length of the anode catalyst layer 16 parallel to the macro-flow direction of fuel (direction of the arrow A) from the upstream side toward the downstream side of the fuel flow channel 20 is designated as L, a length $L_u$ of the high concentration region 40 parallel to the direction of the arrow A from the end 16a is preferably L/1.5 to L/10 and further preferably L/3 to L/6. At the region of the anode catalyst layer 16 where the length $L_u$ parallel to the direction of the arrow A is within the range of L/3 to L/6, there tends to be an increase in fuel crossover in particular. Thus, a reduction in fuel crossover at the region 40 greatly affects improvements in power generation characteristics and power generation efficiency.

The region where the low concentration region 42 is provided is preferably 1/1.5 to 1/10 of the anode catalyst layer 16 from a downstream side end 16b thereof. Specifically, a length $L_d$ of the low concentration region 42 parallel to the direction of the arrow A from the downstream side end 16b is preferably L/1.5 to L/10.

As illustrated in FIG. 3, the middle concentration region 41 may be provided between the high concentration region 40 and the low concentration region 42. When the content of the polymer electrolyte increases stepwise, the middle concentration region 41 may be composed only of one region where the content of the polymer electrolyte is uniform. Alternatively, the middle concentration region 41 may be composed of a plurality of regions with different contents of the polymer electrolyte. Note that when the middle concentration region 41 is composed of two or more parts, the content of the polymer electrolyte in the anode catalyst layer 16 can be further optimized in accordance with the change in the amount of fuel crossover that occurs at the region in between the upstream side end 16a and the downstream side end 16b of the anode catalyst layer 16.

A length $L_m$ of the middle concentration region 41 parallel to the direction of the arrow A is preferably L/1.5 to L/10.

When the anode catalyst layer 16 includes the high concentration region 40, the middle concentration region 41, and the low concentration region 42, the length of each region parallel to the direction of the arrow A may be the same or be different. FIG. 3 illustrates the case where the respective lengths of the high concentration region 40, the middle concentration region 41, and the low concentration region 42 parallel to the direction of the arrow A are the same.

A content $W_u$ of the polymer electrolyte in the high concentration region 40 is preferably 27 to 50 mass % and further preferably 35 to 45 mass %. When the content $W_u$ of the polymer electrolyte is smaller than 27 mass %, the effect of decreasing fuel diffusion at the high concentration region 40 may become small. When the content $W_u$ of the polymer electrolyte in the high concentration region 40 is larger than 50 mass %, fuel diffusion thereat may become too low.

A content $W_d$ of the polymer electrolyte in the low concentration region 42 is preferably 5 to 25 mass % and further preferably 5 to 15 mass %. When the content of the polymer electrolyte in the low concentration region 42 is smaller than 5 mass %, proton conductivity thereat may become too low. When the content of the polymer electrolyte in the low concentration region 42 is larger than 25 mass %, fuel diffusion thereat may become too low.

A difference ($W_u - W_d$) between the content $W_u$ of the polymer electrolyte in the high concentration region 40 and the content $W_d$ of the polymer electrolyte in the low concentration region 42, is preferably 10 mass % or more and 45 mass % or less. By defining the difference ($W_u - W_d$) to be within the above range, fuel crossover can be sufficiently decreased at the high concentration region 40 and fuel can be sufficiently supplied at the low concentration region 42. Thus, power generation characteristics and power generation efficiency of the fuel cell can be further improved.

When the middle concentration region 41 is provided between the high concentration region 40 and the low concentration region 42, a content $W_m$ of the polymer electrolyte in the middle concentration region 41 is selected as appropriate, in accordance with the content $W_u$ of the polymer electrolyte in the high concentration region 40 and the content $W_d$ of the polymer electrolyte in the low concentration region 42. For example, $W_m$ may be selected so that a difference ($W_u - W_m$) is almost equal to a difference ($W_m - W_d$). Alternatively, $W_m$ may be selected so that the difference ($W_u - W_m$) is larger than the difference ($W_m - W_d$), or so that the difference ($W_m - W_d$) is larger than the difference ($W_u - W_m$). Also, when the middle concentration region 41 is composed of a plurality of regions, the content of the polymer electrolyte in each part of the middle concentration region 41 may also be selected as appropriate.

Even in the case where the content of the polymer electrolyte changes continuously from the end portion of the upstream-side region toward the end portion of the downstream-side region of the anode catalyst layer 16, provided that the length of the anode catalyst layer parallel to the macro-flow direction of fuel (direction of the arrow A) in FIG. 3 is designated as L, it is preferable that the content of the polymer electrolyte in the region of the anode catalyst layer being L/1.5 to L/10 and preferably being L/3 to L/6 from the upstream side end 16a (corresponding to the above high concentration region 40), is 27 to 50 mass %. The content of the polymer electrolyte in the remaining region (corresponding to the above low concentration region 42) of the anode catalyst layer is preferably 5 to 25 mass %. Herein, in the case where the content of the polymer electrolyte changes continuously from the upstream side toward the downstream side of the anode catalyst layer 16, the content of the polymer electrolyte is the average content of the polymer electrolyte in each region. Also, in this case as well, the difference in the content of the polymer electrolyte between the part corresponding to the high concentration region and the part corresponding to the low concentration region is preferably 10 mass % or more and 45 mass % or less.

Whether the content of the polymer electrolyte decreases continuously or stepwise, the amount of the anode catalyst is preferably uniform in the entire anode catalyst layer 16. By changing the content of the polymer electrolyte, fuel diffusion can be controlled and fuel supply in the entire anode catalyst layer 16 can be made uniform. By making the amount of the anode catalyst uniform in the entire anode catalyst layer 16, power generation can be carried out evenly in the entire anode catalyst layer 16, thereby enabling improvements in power generation characteristics and power generation efficiency.

The amount of the anode catalyst in the anode catalyst layer is preferably 1 to 10 mg per projected area (1 cm$^2$) of the anode catalyst layer.

The thickness of the anode catalyst layer 16 is preferably entirely uniform. The cell and the stack components basically have uniform thicknesses, and the cell and the stack are clamped as a whole by applying even pressure in the thickness directions thereof. Thus, if the thickness of the anode catalyst layer 16 changes, the thickness of other portion(s) of the MEA, such as the diffusion layer or the electrolyte membrane, would need to be changed to absorb that change in the thickness of the anode catalyst layer 16. Such changes in the respective thicknesses of the anode catalyst layer 16 and other portion(s) result in an undesirably change in the balance of the MEA, possibly causing deterioration in power generation characteristics as a whole. The thickness of the anode catalyst layer 16 is preferably 10 to 100 μm.

The content of the polymer electrolyte is preferably uniform in the thickness direction of the anode catalyst layer 16. In the case of a direct oxidation fuel cell, when the content of the polymer electrolyte is changed in the direction of the anode catalyst layer 16, liquid fuel such as methanol may easily diffuse through the anode catalyst layer 16. In this case, fuel crossover increases and power generation characteristics deteriorate. On the other hand, making the content of the polymer electrolyte uniform in the thickness direction of the anode catalyst layer 16 enables suppression in the increase of fuel crossover, compared to when the content of the polymer electrolyte is changed. Thus, deterioration in power generation characteristics can be further suppressed.

The method for producing the anode catalyst layer is not particularly limited. For example, the anode catalyst layer 16 as illustrated in FIG. 3 can be produced in the following manner.

An anode catalyst or a supported anode catalyst and a dispersion medium such as water or an alcohol are mixed to prepare a plurality of inks for forming an anode catalyst layer each differing in the content of a polymer electrolyte. The plurality of inks for forming an anode catalyst layer each differing in the polymer electrolyte content are respectively applied to individual substrate sheets made of polytetrafluoroethylene (PTFE) by a method such as doctor blading or spraying, and then dried to produce a plurality of small anode catalyst layers each differing in the polymer electrolyte content. Each of these small layers is disposed on an electrolyte membrane. At this time: the small anode catalyst layer with the largest polymer electrolyte content is disposed on the area where the high concentration region 40 is disposed; the small anode catalyst layer with the second largest polymer electrolyte content is disposed on the area where the middle concentration region 41 is disposed; and the small anode catalyst layer with the smallest polymer electrolyte content is disposed on the area where the low concentration region 42 is disposed. Then, these small anode catalyst layers are joined to the electrolyte membrane by a method such as hot pressing. In this manner, it is possible to obtain an anode catalyst layer in which the content of the polymer electrolyte is changed from the upstream side toward the downstream side of the fuel flow channel.

Alternatively, the anode catalyst layer can also be formed in the following manner. First, three kinds of inks for forming an anode catalyst layer are prepared, each differing in polymer electrode content. The ink for forming an anode catalyst layer with the highest polymer electrolyte content is applied onto one substrate sheet at the area where the high concentration region is disposed, and then dried. The ink for forming an anode catalyst layer with the second highest polymer electrolyte content is applied onto the substrate sheet at the area where the middle concentration region is disposed, and then dried. Next, the ink for forming an anode catalyst layer with the lowest polymer electrolyte content is applied onto the substrate sheet at the area where the low concentration region is disposed, and then dried. In this manner also, it is possible to obtain an anode catalyst layer in which the content of the polymer electrolyte is changed from the upstream side toward the downstream side of the fuel flow channel.

Alternatively, three kinds of inks for forming an anode catalyst layer each differing in polymer electrolyte content may be applied in sequence onto an electrolyte membrane, and then dried.

Note that when an anode catalyst layer is composed of only two parts with their respective polymer electrolyte contents differing from each other, the anode catalyst layer can be formed with use of two inks for forming an anode catalyst layer. Likewise, when an anode catalyst layer is composed of three or more parts with their respective polymer electrolyte contents differing from one another, the anode catalyst layer can be formed with use of three or more inks for forming an anode catalyst layer, each differing in polymer electrolyte content.

Figure 4:
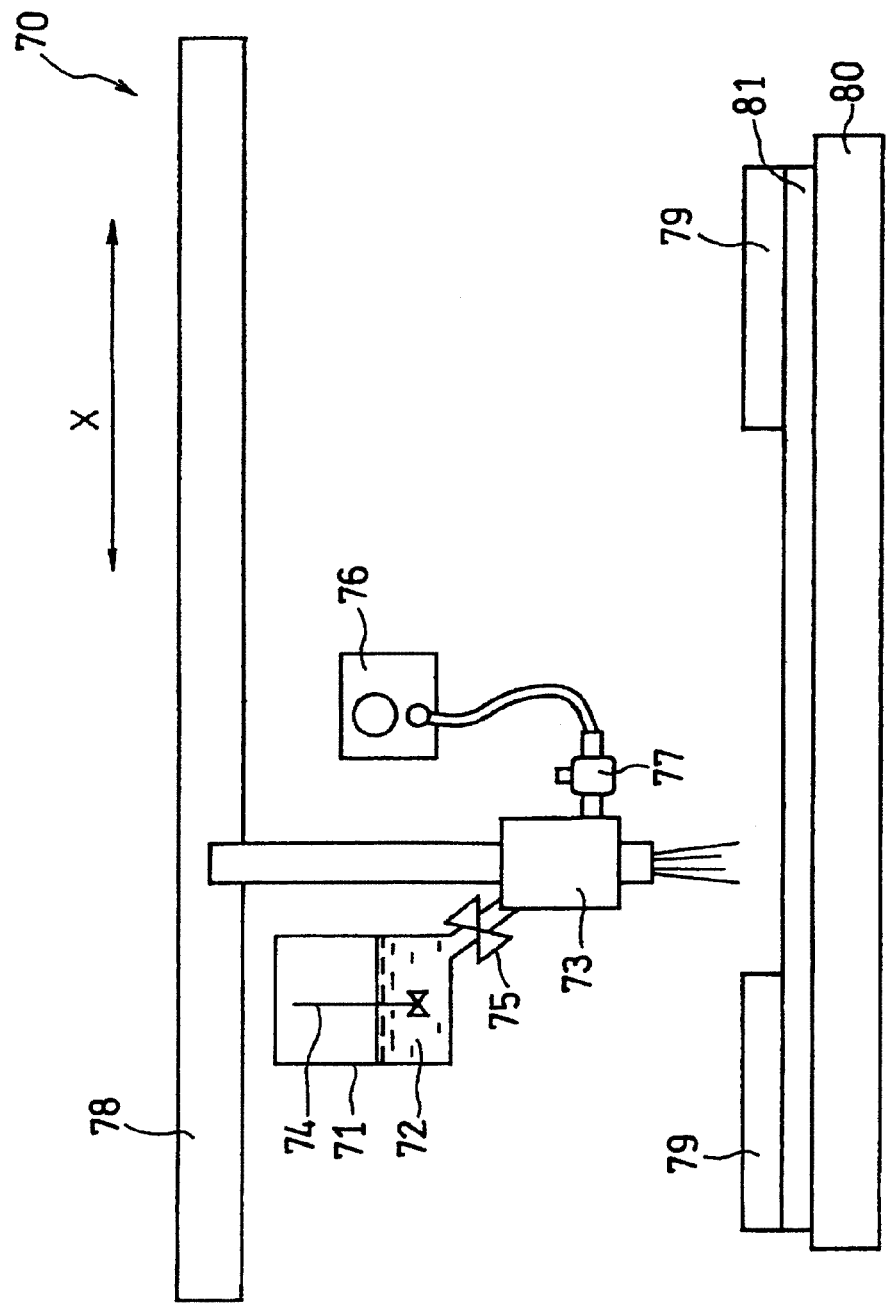
FIG. 4 is a side view schematically illustrating an example of a configuration of a spray coating device.

In the following, an example of when an anode catalyst layer is produced with use of a spray coating device will be described with reference to a drawing. FIG. 4 is a side view schematically illustrating a configuration of a spray coating device.

The spray coating device 70 is provided with a tank 71 containing an ink 72 for forming an anode catalyst layer and a spray gun 73 for spraying out the ink 72.

Inside the tank 71, the ink 72 is mixed with a kneader 74 and is always in a flowing state. The ink 72 is supplied to the spray gun 73 via an open/close valve 75, and together with a jet gas, sprayed out of the spray gun 73. The jet gas is supplied to the spray gun 73 via a gas pressure adjuster 76 and a gas flow adjuster 77. The jet gas can be, for example, a nitrogen gas.

In the coating device 70 of FIG. 4, an actuator 78 enables the spray gun 73 to move at a variable speed from a variable position, in the two directions of an axis X parallel to an arrow X and an axis Y perpendicular to the axis X.

A substrate sheet 81 is disposed below the spray gun 73. FIG. 4 illustrates the manner in which the ink 72 is applied to the substrate sheet 81. The substrate sheet 81 is disposed below the spray gun 73, and the ink 72 is applied to the substrate sheet 81 by moving the spray gun 73 as it sprays out the ink 72. The region where the ink 72 is applied to the substrate sheet 81 can be adjusted with a mask 79. Also, in the coating device 70, the surface temperature of the substrate sheet 81 is controlled by a heater 80 disposed so as to be in contact with the substrate sheet 81.

As described above, in the coating device 70, the spray gun 73 can spray out the ink 72 while being moved to an variable position. That is, if the ink 72 contained in the tank 71 is changed into, in successive order, a plurality of inks for forming an anode catalyst layer each differing in polymer electrolyte content, the polymer electrolyte content can be changed at predefined positions on the substrate sheet 81. Thus, the use of the coating device 70 enables production of an anode catalyst layer in which the content of the polymer electrolyte is higher at the upstream-side region of the anode catalyst layer than at the downstream-side region thereof.

Note that changing continuously the content of the polymer electrolyte in the ink 72 contained in the tank 71 also enables obtaining an anode catalyst layer in which the content of the polymer electrolyte changes continuously from the upstream-side region toward the downstream-side region of the anode catalyst layer.

As described above, the direct oxidation fuel cell of the present invention is characterized by an anode catalyst layer. Components other than the anode catalyst layer are not particularly limited, and for example, the same components as those in a conventional direct oxidation fuel cell can be used. The components other than the anode catalyst layer are described below with reference to FIG. 1.

The cathode catalyst layer 18 includes a cathode catalyst and a polymer electrolyte. The cathode catalyst is preferably a noble metal with high catalytic activity such as platinum. Also, an alloy of platinum and cobalt or the like can be used as the cathode catalyst. The cathode catalyst can be used with or without a support. The support can be of the same carbon material as that supporting the anode catalyst. The polymer electrolyte included in the cathode catalyst layer 18 can be of the same material as that used in the anode catalyst layer.

The cathode catalyst layer 18 can be produced, for example, in the following manner. For example, a cathode catalyst or a supported cathode catalyst, a polymer electrolyte, and a dispersion medium such as water or an alcohol are mixed to prepare an ink for forming a cathode catalyst layer. Then, the ink for forming a cathode catalyst layer is applied to a substrate sheet made of PTFE by a method such as doctor blading or spraying, and then dried to obtain the cathode catalyst layer 18. The cathode catalyst layer 18 obtained in this manner is transferred from the substrate sheet to the electrolyte membrane 10.

Alternatively, the cathode catalyst layer 18 may be formed directly on the electrolyte membrane 10, by applying the ink for forming a cathode catalyst layer to the electrolyte membrane 10 and then drying it.

The electrolyte membrane 10 can be, for example, any conventionally-used proton conductive polymer membrane. Specifically, use of a perfluorosulfonic acid-based polymer membrane, a hydrocarbon-based polymer membrane, or the like is preferable. Examples of the perfluorosulfonic acid-based polymer membrane include Nafion® and Flemion®. Examples of the hydrocarbon-based polymer membrane include sulfonated polyetheretherketone and sulfonated polyimide. Particularly, the hydrocarbon-based polymer membrane is preferable as the electrolyte membrane 10. In the perfluorosulfonic acid-based polymer membrane, since cluster structure of the sulfonic acid group is formed, the permeability of fuel may increase. On the other hand, in the case of the hydrocarbon-based polymer membrane, since the formation of cluster structure of the sulfonic acid group is suppressed, the permeability of fuel can be reduced. The thickness of the electrolyte membrane 10 is preferably 20 μm to 150 μm.

As illustrated in FIG. 2, the anode diffusion layer 17 includes the conductive water-repellent layer 171 disposed so as to be in contact with the anode catalyst layer 16 and the substrate layer 172 disposed so as to be in contact with the anode-side separator 14. The cathode diffusion layer 19 includes the conductive water-repellent layer 191 disposed so as to be in contact with the cathode catalyst layer 18 and the substrate layer 192 disposed so as to be in contact with the cathode-side separator 15. Each of the conductive water-repellent layers 171 and 191 includes a conductive material and water repellent material. The substrate layers 172 and 192 are made of a conductive porous material.

The conductive material included in the conductive water-repellent layers 171 and 191 can be any conductive material conventionally used in the field of fuel cells. Specifically, examples of the conductive material include carbon powders such as carbon black and flake graphite; and carbon fibers such as carbon nanotubes and carbon nonofibers. These conductive materials can be used alone or in combination.

The water repellent material included in the conductive water-repellent layers 171 and 191 can be any water repellent material conventionally used in the field of fuel cells. Specifically, the water repellent material is preferably, for example, a fluorocarbon resin. The fluorocarbon resin can be any known material in the art. Examples of the fluorocarbon resin include polytetrafluoroethylene (PTFE), tetrafluoroethylene-hexafluoropropylene copolymer (FEP), tetrafluoroethylene-perfluoroalkylvinylether copolymer, tetrafluoroethylene-ethylene copolymer, and polyvinylidene fluoride. Among them, for example, PTFE and FEP are preferable. These water repellent materials can be used alone or in combination.

The conductive water-repellent layers 171 and 191 are formed on the surfaces of the substrate layers 172 and 192, respectively. The methods of forming the conductive water-repellent layers 171 and 191 are not particularly limited. For example, a conductive material and a water repellent material are dispersed in a predetermined dispersion medium to prepare a paste for forming a conductive water-repellent layer. This paste is applied to one face of a substrate layer by doctor blading or spraying, and then dried. In this manner, a conductive water-repellent layer can be formed on the surface of the substrate layer.

As described above, the substrate layers 172 and 192 are made of a conductive porous material. The conductive porous material can be any material conventionally used in the field of fuel cells. Particularly, the conductive porous material is preferably a highly electron-conductive material having good diffusibility of fuel or oxidant. Examples of such materials include carbon paper, carbon cloth, and carbon non-woven fabric. These porous materials may contain a water repellent material in order to improve the diffusion of fuel and removal of product water. The water repellent material can be the same material as the water repellent material included in the conductive water-repellent layer. The method of adding a water repellent material to a porous material is not particularly limited. For example, a porous material is immersed in a dispersion of a water repellent material and then dried to obtain a substrate layer composed of the porous material containing the water repellent material.

A hydrocarbon-based fluid such as methanol, ethanol, dimethyl ether, formic acid, and ethylene glycol can be used as the liquid fuel supplied to the anode. Among them, an aqueous methanol solution with a methanol concentration of 1 mol/L to 8 mol/L is preferable as the liquid fuel. It is more preferable that the methanol concentration in the aqueous methanol solution is 2 mol/L to 5 mol/L, particularly, 3 mol/L to 5 mol/L. A higher fuel concentration leads to more reduction in the size and weight of the entire fuel cell system, but may cause a larger fuel amount of MCO. According to the present embodiment, since MCO can be reduced, it is possible to use an aqueous methanol solution with a higher methanol concentration than conventional concentrations. If the methanol concentration is lower than 1 mol/L, it may be difficult to reduce the size and weight of the fuel cell system. If the methanol concentration exceeds 8 mol/L, MCO may not be sufficiently reduced. The use of a fuel having the above-described methanol concentration can more desirably ensure the supply of methanol to the anode catalyst layer at the downstream side of the fuel flow channel, while also reducing MCO through the anode catalyst layer at the upstream side of the fuel flow channel.

The respective materials of the anode-side separator and the cathode-side separator are also not particularly limited, but are preferably a carbon material, a metal material coated with carbon, or the like, due to being high in electronic conductivity and acid resistance. The anode-side separator has a fuel flow channel for supplying a liquid fuel to the anode. The cathode-side separator has an oxidant flow channel for supplying an oxidant to the cathode. The respective shapes of the fuel flow channel and the oxidant flow channel are not particularly limited. Examples of the respective shapes of the fuel flow channel and the oxidant flow channel include a serpentine shape and a parallel shape.

The direct oxidation fuel cell may be produced, for example, in the following manner. The membrane electrode assembly 13 is produced by joining the anode 11 to one face of the electrolyte membrane 10 and the cathode 12 to the other face by hot pressing or the like. The membrane electrode assembly 13 is then sandwiched between the anode-side separator 14 and the cathode-side separator 15. At this time, to tightly seal the anode 11 and the cathode 12 of the resultant membrane electrode assembly 13 with the gaskets 22 and 23, respectively, the gasket 22 is disposed between the electrolyte membrane 10 and the anode-side separator 14, and the gasket 23 is disposed between the electrolyte membrane 10 and the cathode-side separator 15. Thereafter, the anode-side separator 14 and the cathode-side separator 15 are sandwiched between current collector plates 24 and 25, heaters 26 and 27, insulator plates 28 and 29, and end plates 30 and 31, respectively, and they are clamped with a clamp not illustrated in the drawings. In this manner, the fuel cell 1 can be produced.

EXAMPLES

The invention is hereinafter described specifically by way of Examples, but the invention is not to be construed as being limited to the following examples.

Example 1

(a) Production of Anode Catalyst Layer

A Pt—Ru alloy catalyst (Pt:Ru=1:1 (atomic ratio)) was used as an anode catalyst. The anode catalyst was supported on a support to be used as a supported anode catalyst. Ketjen black (ECP available from Ketjen Black International Company, Ltd.) was used as the support. The mass ratio of ketjen black to the Pt—Ru alloy catalyst was ketjen black:Pt—Ru alloy=50:50.

A dispersion of the supported anode catalyst in an isopropanol aqueous solution was mixed with a dispersion of Nafion® (5 mass % Nafion solution available from Sigma-Aldrich Japan K.K.) serving as a polymer electrolyte, to prepare an ink for forming an anode catalyst layer. At this time, three kinds of inks A to C for forming an anode catalyst layer were prepared by changing the mass ratio of the supported anode catalyst to the polymer electrolyte. In the ink A, the mass ratio of the supported anode catalyst to the polymer electrolyte was 90:10 (polymer electrolyte content of 10 mass %). In the ink B, the mass ratio of the supported anode catalyst to the polymer electrolyte was 75:25 (polymer electrolyte content of 25 mass %). In the ink C, the mass ratio of the supported anode catalyst to the polymer electrolyte was 60:40 (polymer electrolyte content of 40 mass %). Herein, the polymer electrolyte content is the ratio of the mass of the polymer electrolyte relative to the total of the supported anode catalyst and the polymer electrolyte.

Subsequently, an anode catalyst layer as illustrated in FIGS. 2 and 3 was produced to have a size of 6 cm×6 cm, on a polytetrafluoroethylene (PTFE) sheet and with use of a spray coating device as illustrated in FIG. 4. At this time, the 6 cm×6 cm ink-applied region on the PTFE sheet was divided into three 6 cm×2 cm regions. These regions were designated as a high concentration region, a middle concentration region, and a low concentration region, respectively. The ink C (polymer electrolyte content of 40 mass %) was applied to the high concentration region. While the ink C was being applied to the high concentration region, the middle concentration region and the low concentration region on the PTFE sheet were masked. Likewise, the ink B (polymer electrolyte content of 25 mass %) was applied to the middle concentration region, and the ink A (polymer electrolyte content of 10 mass %) was applied to the low concentration region.

The thickness of the entire anode catalyst layer thus obtained was roughly uniform, being about 60 µm. Also, the amount of the anode catalyst was roughly uniform in the entire anode catalyst layer, being about 5 mg per projected area (1 cm$^2$).

(b) Production of Cathode Catalyst Layer

A Pt catalyst was used as a cathode catalyst. The cathode catalyst was supported on ketjen black to be used as a supported cathode catalyst. The mass ratio of ketjen black to Pt was ketjen black:Pt=50:50. Except for using this supported cathode catalyst, an ink for forming a cathode catalyst layer was prepared in the same manner as the ink B for forming an anode catalyst layer was prepared. The mass ratio of the supported cathode catalyst to the polymer electrolyte was 75:25.

The obtained ink for forming an anode catalyst layer was applied to a 6 cm×6 cm region on a PTFE sheet with use of a spray coating device and then dried to obtain a cathode catalyst layer.

(c) Preparation of Paste for Forming a Conductive Water-Repellent Layer

A dispersion of a water repellent material and a conductive material were dispersed and mixed in an ion-exchanged water to which a surfactant had been added, to prepare a paste for forming a conductive water-repellent layer. A PTFE dispersion (PTFE content of 60 mass %, available from Sigma-Aldrich Japan K.K.) was used as the dispersion of a water repellent material. Acetylene black (DENKA BLACK available from Denki Kagaku Kogyo K.K.) was used as the conductive material. The mass ratio of acetylene black to PTFE in the paste was 50:50.

(d) Production of Substrate Layer

A carbon paper (TGP-H-090, thickness of 280 µm, available from Toray Industries Inc.) was used as the conductive porous material constituting an anode substrate layer of an anode diffusion layer. The carbon paper was immersed in a PTFE dispersion (available from Sigma-Aldrich Japan K.K.) and then dried. In this manner, the carbon paper was made water-repellent.

A carbon cloth (AvCarb® 1071HCB available from Ballard Material Products Inc.) was used as the conductive porous material constituting a cathode substrate layer of a cathode diffusion layer. This carbon cloth was also made water-repellent in the same manner as described above.

(e) Production of Anode Diffusion Layer and Cathode Diffusion Layer

The paste prepared in (c) was applied to one face of the anode substrate layer produced in (d), and then dried to produce an anode diffusion layer. Likewise, the paste was applied to one face of the cathode substrate layer produced in (d), and then dried to produce a cathode diffusion layer.

(f) Production of Membrane Electrode Assembly (MEA)

The cathode catalyst layer on the PTFE sheet was stacked on one face of an electrolyte membrane with a size of 12 cm×12 cm, while the anode catalyst layer on another PTFE sheet was stacked on the other face of the electrolyte membrane. The cathode catalyst layer and the anode catalyst layer were joined to the electrolyte membrane by hot pressing, and the PTFE sheets were separated from the catalyst layers. Next, the cathode diffusion layer was joined to the cathode catalyst layer, while the anode diffusion layer was joined to the anode catalyst layer. In this manner, a membrane electrode assembly (MEA) was produced. Note that Nafion® (Nafion 112 available from E.I. Du Pont de Nemours & Co. Inc.) was used as the electrolyte membrane.

(g) Production of Fuel Cell

A rubber gasket was disposed on each face of the electrolyte membrane exposed at the outer peripheral portion of the MEA. Subsequently, the MEA was sandwiched between an anode-side separator made of carbon and a cathode-side separator made of carbon. On the face of the anode-side separator in contact with the anode, a fuel flow channel for supplying a liquid fuel to the anode was formed in advance. On the face of the cathode-side separator in contact with the cathode, an oxidant flow channel for supplying an oxidant to the cathode was formed in advance. The fuel flow channel and the oxidant flow channel were both of a serpentine shape. Further, the respective outer sides of the anode-side separator and the cathode-side separator were each stacked with a current collector plate, a heater, an insulator plate, and an end plate in this order, and the resultant stack was clamped with predetermined clamping means. In this manner, a direct oxidation fuel cell (direct methanol fuel cell) of Example 1 was produced. Note that in the following evaluation test, the current collector plates were connected to an electronic load unit.

(h) Evaluation of Power Generation Characteristics

Power was generated as follows. Air was supplied to the cathode of the fuel cell, while a 2 mol/L aqueous methanol solution was supplied from a fuel tank to the anode. The fuel cell was connected to an electronic load unit in advance, and the current to be generated was set to a constant current of 150 mA/cm$^2$ by the electronic load unit. The power generation time was set to 60 minutes. The temperature of the fuel cell was kept at 60° C., the air utilization rate was set to 50%, and the fuel utilization rate was set to 70%.

The average voltage during the power generation time of 60 minutes was obtained as a power generation characteristic. Also, the power generation efficiency was obtained using the following formula (1):

$$\text{Fuel efficiency} = \text{generated current}/(\text{generated current} + \text{converted current of MCO}) \quad (1)$$

Note that the amount of methanol due to MCO was obtained as follows. The methanol concentration in the effluent discharged from the anode was measured by a gas chromatograph. With use of: an amount of methanol supplied to the anode; an amount of methanol used for the power generation; and an amount of methanol discharged to the effluent obtained as above, the material balance in the anode was calculated to obtain the amount of methanol due to MCO. The results are shown in Table 1.

Example 2

Except for changing the mass ratio of the supported anode catalyst to the polymer electrolyte to 70:30 (polymer electrolyte content of 30 mass %), an ink D for forming an anode catalyst layer was prepared in the same manner as the inks A to C were prepared in Example 1.

Except for changing the mass ratio of the supported anode catalyst to the polymer electrolyte to 80:20 (polymer electrolyte content of 20 mass %), an ink E was prepared in the same manner as the inks A to C were prepared in Example 1.

For the production of an anode catalyst layer, a 6 cm×6 cm ink-applied region on a PTFE sheet was divided into three 6 cm×2 cm regions, as in Example 1. These regions were designated as a high concentration region, a middle concentration region, and a low concentration region. The ink D (polymer electrolyte content of 30 mass %) was applied to the high concentration region, the ink B (polymer electrolyte content of 25%) was applied to the middle concentration region, and the ink E (polymer electrolyte content of 20 mass %) was applied to the low concentration region. Other than the above, an anode catalyst layer was produced in the same manner as in Example 1. The thickness of the entire anode catalyst layer thus obtained was roughly uniform, being about 60 μm. The amount of the anode catalyst was roughly uniform in the entire anode catalyst layer, being about 5 mg per projected area (1 cm$^2$).

Except for the use of the anode catalyst layer as obtained above, a direct oxidation fuel cell of Example 2 was produced in the same manner as in Example 1.

The fuel cell thus produced was evaluated for power generation characteristics in the same manner as in Example 1. The results are shown in Table 1.

Example 3

For the production of an anode catalyst layer, a 6 cm×6 cm ink-applied region on a PTFE sheet was divided into five 6 cm×1.2 cm regions. Among the five regions, the region at one end was designated as a high concentration region and the region at the other end was designated as a low concentration region. The remaining three regions in the middle were designated as middle concentration regions.

In the same manner as in Example 1, the ink C (polymer electrolyte content of 40 mass %) was applied to the high concentration region (6 cm×1.2 cm). The ink B (polymer electrolyte content of 25 mass %) was applied to the middle concentration region (6 cm×3.6 cm). The ink A (polymer electrolyte content of 10 mass %) was applied to the low concentration region (6 cm×1.2 cm). Other than the above, an anode catalyst layer was produced in the same manner as in Example 1. The thickness of the entire anode catalyst layer thus obtained was roughly uniform, being about 60 μm. The amount of the anode catalyst was roughly uniform in the entire anode catalyst layer, being about 5 mg per projected area (1 cm$^2$).

Except for the use of the anode catalyst layer as obtained above, a direct oxidation fuel cell of Example 3 was produced in the same manner as in Example 1.

The fuel cell thus produced was evaluated for power generation characteristics in the same manner as in Example 1. The results are shown in Table 1.

Example 4

Except for changing the mass ratio of the supported anode catalyst to the polymer electrolyte to 50:50 (polymer electrolyte content of 50 mass %), an ink F was prepared in the same manner as the inks A to C were prepared in Example 1.

For the production an anode catalyst layer, a 6 cm×6 cm ink-applied region on a PTFE sheet was divided into five 6 cm×1.2 cm regions. These five regions were designated as a high concentration region, a first middle concentration region, a second middle concentration region, a third middle concentration region, and a low concentration region, in this order starting from one end.

The ink F (polymer electrolyte content of 50 mass %) was applied to the high concentration region. The ink C (polymer electrolyte content of 40 mass %) was applied to the first middle concentration region, the ink D (polymer electrolyte content of 30 mass %) was applied to the second middle concentration region, and the ink E (polymer electrolyte content of 20 mass %) was applied to the third middle concentration region. The ink A (polymer electrolyte content of 10 mass %) was applied to the low concentration region. Other than the above, an anode catalyst layer was formed in the same manner as in Example 1. The thickness of the entire anode catalyst layer thus obtained was roughly uniform, being about 60 μm. The amount of the anode catalyst was roughly uniform in the entire anode catalyst layer, being about 5 mg per projected area (1 cm$^2$).

Except for the use of the anode catalyst layer as obtained above, a direct oxidation fuel cell of Example 4 was produced in the same manner as in Example 1.

The fuel cell thus produced was evaluated for power generation characteristics in the same manner as in Example 1. The results are shown in Table 1.

Example 5

A direct oxidation fuel cell was produced in the same manner as in Example 1. The fuel cell thus produced was evaluated for power generation characteristics in the same manner as in Example 1, except that the concentration of the aqueous methanol solution supplied to the fuel cell was set to 4 mol/L. The results are shown in Table 1.

Comparative Example 1

An anode catalyst layer was obtained in the same manner as in Example 1, except that the ink B (polymer electrolyte content of 25 mass %) was applied to the whole 6 cm×6 cm ink-applied region on the PTFE sheet. The thickness of the entire anode catalyst layer thus obtained was roughly uniform, being about 60 μm. The amount of the anode catalyst was roughly uniform in the entire anode catalyst layer, being about 5 mg per projected area (1 cm$^2$).

Except for the use of the anode catalyst layer as obtained above, a direct oxidation fuel cell of Comparative Example 1 was produced in the same manner as in Example 1.

The fuel cell thus produced was evaluated for power generation characteristics in the same manner as in Example 1. The results are shown in Table 1.

Comparative Example 2

In the present comparative example, an anode catalyst layer was divided into two regions being an upstream-side region and a downstream-side region. At these two regions, the porosity was changed without changing the mass ratio of the anode catalyst to the polymer electrolyte.

For the preparation of an ink for forming an anode catalyst layer, an ink G with a polymer electrolyte content of 25 mass % was prepared in the same manner as the ink B was prepared in Example 1, except that ethylene glycol monoethyl ether was the dispersion medium. An ink H with a polymer electrolyte content of 25 mass % was prepared in the same manner as above, except that ethanol was the dispersion medium.

For the preparation of an anode catalyst layer, a 6 cm×6 cm ink-applied region on a PTFE sheet was divided into two 6 cm×3 cm regions. One region was designated as an upstream-side region, and the other region was designated as a downstream-side region. The ink G (polymer electrolyte content of 25 mass %) was applied to the upstream-side region, and the ink H (polymer electrolyte content of 25 mass %) was applied to the downstream-side region. Other than the above, an anode catalyst layer was obtained in the same manner as in Example 1.

The thickness of the entire anode catalyst layer thus obtained was roughly uniform, being about 60 μm. The amount of the anode catalyst on the upstream-side region was about 6 mg per projected area (1 cm$^2$). The amount of the anode catalyst on the downstream-side region was about 4 mg per projected area (1 cm$^2$).

Except for the use of the anode catalyst layer as described above, a direct oxidation fuel cell of Comparative Example 2 was produced in the same manner as in Example 1.

The fuel cell thus produced was evaluated for power generation characteristics in the same manner as in Example 1. The results are shown in Table 1.

Comparative Example 3

A direct oxidation fuel cell was produced in the same manner as in Comparative Example 1. The fuel cell thus produced was evaluated for power generation characteristics in the same manner as in Example 1, except that the concentration of the aqueous methanol solution supplied to the fuel cell was set to 4 mol/L. The results are shown in Table 1.

solution was used and the fuel cell of Comparative Example 1. From this result, it is apparent that a direct oxidation fuel cell including the above-described anode catalyst layer is extremely effective with a high concentration of methanol. Note that the use of a high concentration of methanol enables further reduction in size of the fuel cell system.

In the fuel cell of Comparative Example 2, the porosities of the regions upstream and downstream of the fuel were changed, without any change made to the composition of the anode catalyst layer. In the fuel cell of Comparative Example 2, there were slight deteriorations in power generation characteristics and fuel efficiency, compared to the fuel cell of Comparative Example 1. This is considered to be due to the fuel cell of Comparative Example 2 not having been able to

TABLE 1

| | Polymer electrolyte content (mass %) | | | | Power generation characteristic (v) | Fuel efficiency |
|---|---|---|---|---|---|---|
| | High concentration region | Middle concentration region | | | Low concentration region | |
| Example 1 | 40 | 25 | | | 10 | 0.46 | 0.85 |
| Example 2 | 30 | 25 | | | 20 | 0.43 | 0.82 |
| Example 3 | 40 | 25 | | | 10 | 0.46 | 0.84 |
| Example 4 | 50 | 40 ($1^{st}$) | 30 ($2^{nd}$) | 20 ($3^{rd}$) | 10 | 0.47 | 0.87 |
| Example 5 | 40 | 25 | | | 10 | 0.42 | 0.79 |
| Comp. Example 1 | | 25 | | | | 0.38 | 0.75 |
| Comp. Example 2 | 25 | — | | | 25 | 0.37 | 0.75 |
| Comp. Example 3 | | 25 | | | | 0.32 | 0.68 |

From the results of Examples 1 to 5, it is evident that power generation characteristics and fuel efficiency improve significantly by the content of the polymer electrolyte in the anode catalyst layer being made higher at the upstream-side region of the anode catalyst layer than at the downstream-side region thereof, compared to the case where the content of the polymer electrolyte in the anode catalyst layer is made uniform (Comparative Example 1). These properties are considered to have improved, due to MCO being reduced at the upstream-side region of the anode catalyst layer and methanol supply being sufficiently ensured at the downstream-side region thereof.

Further improvements in power generation characteristics and fuel efficiency were seen in the fuel cell of Example 1 in which there was a large difference in polymer electrolyte content between the upstream region-side and the downstream-side region of the anode catalyst layer and in the fuel cell of Example 4 in which polymer electrolyte content was decreased stepwise from the upstream-side region toward the downstream-side region of the anode catalyst layer, compared to the fuel cells of the other examples. This is considered to be due to the fuel cells of Examples 1 and 4 having been able to effectively achieve even further, the effects of MCO being reduced, methanol supply being ensured, and the like.

Favorable power generation characteristics were also achieved in Example 5 in which an aqueous methanol solution with a high concentration of 4 mol/L was used as the fuel. Further, the difference in characteristics between the fuel cell of Example 5 and the fuel cell of Comparative Example 3 in which a 4 mol/L aqueous methanol solution was used, is greater than the difference in characteristics between the fuel cell of Example 1 in which a 2 mol/L aqueous methanol sufficiently achieve the effects of MCO being reduced, methanol supply being ensured, and the like.

As above, it has been found that a direct oxidation fuel cell that is improved in power generation characteristics and power generation efficiency can be obtained, by using the anode catalyst layer as described above.

A direct oxidation fuel cell including the above-described anode catalyst layer has good power generation characteristics and power generation efficiency. Thus, the use of such direction oxidation fuel cell enables an improvement in the performance of the fuel cell system. Therefore, such direct oxidation fuel cell is very useful as the power source for small-sized devices such as cellular phones and notebook personal computers.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A direct oxidation fuel cell comprising at least one cell, said cell being a stacked body comprising: a membrane electrode assembly comprising an anode, a cathode, and an electrolyte membrane disposed between said anode and said cathode; an anode-side separator having a fuel flow channel for supplying a liquid fuel to said anode; and a cathode-side separator having an oxidant flow channel for supplying an oxidant to said cathode, wherein said anode-side separator comprises a first region comprising an upstream half of said fuel flow channel and a second region comprising a downstream half of said fuel flow channel, said anode comprises an anode catalyst layer in contact with said electrolyte membrane and an anode diffusion layer in contact with said anode-side separator, said anode catalyst layer comprises an anode catalyst and a polymer electrolyte, said anode catalyst layer comprises an upstream-side region facing said first region and a downstream-side region facing said second region, and the content of said polymer electrolyte in said anode catalyst layer is 27 to 50% mass at said upstream-side region, and 5 to 25% mass at said downstream-side region.

2. The direct oxidation fuel cell in accordance with claim 1 wherein the content of said polymer electrolyte in said anode catalyst layer decreases stepwise from an end portion of said upstream-side region toward an end portion of said downstream-side region.

3. The direct oxidation fuel cell in accordance with claim 1 wherein said high concentration region is present at a region covering an area that is 1/3 to 1/6 of said upstream-side region from the end portion thereof.

4. The direct oxidation fuel cell in accordance with claim 1 wherein the difference between the contents of said polymer electrolyte respectively contained in said high concentration region and said low concentration region is within the range of 10 to 45 mass %.

5. The direct oxidation fuel cell in accordance with claim 1 wherein the content of said polymer electrolyte in said anode catalyst layer decreases continuously from the end portion of said upstream-side region toward the end portion of said downstream-side region.

6. The direct oxidation fuel cell in accordance with claim 1 wherein the amount of said anode catalyst contained per projected area (1 $cm^2$) is uniform on an entire face of said anode catalyst layer.

7. The direct oxidation fuel cell in accordance with claim 6 wherein the amount of said anode catalyst is 1 to 10 mg.

8. The direct oxidation fuel cell in accordance with claim 1 wherein said anode catalyst layer has a uniform thickness.

9. The direct oxidation fuel cell in accordance with claim 1 wherein the thickness of said anode catalyst layer is within the range of 10 to 100 μm.

10. The direct oxidation fuel cell in accordance with claim 1 wherein the content of said polymer electrolyte is uniform in the thickness direction of said anode catalyst layer.

11. The direct oxidation fuel cell in accordance with claim 1 wherein the fuel is an aqueous methanol solution with a methanol concentration of 3 mol/L to 5 mol/L.

* * * * *